United States Patent
Jonas (10) Patent No.: US 10,084,976 B2
(45) Date of Patent: Sep. 25, 2018

(54) FLUX RATE UNIT CELL FOCAL PLANE ARRAY

(71) Applicant: RAYTHEON COMPANY, Waltham, MA (US)

(72) Inventor: Matthew Jonas, McKinney, TX (US)

(73) Assignee: RAYTHEON COMPANY, Waltham, MA (US)

(*) Notice: Subject to any disclaimer, the term of this patent is extended or adjusted under 35 U.S.C. 154(b) by 0 days.

(21) Appl. No.: 15/341,090

(22) Filed: Nov. 2, 2016

(65) Prior Publication Data
US 2018/0124336 A1    May 3, 2018

(51) Int. Cl.
    *H04N 5/355*    (2011.01)
    *H04N 5/378*    (2011.01)
    *H04N 5/232*    (2006.01)

(52) U.S. Cl.
    CPC ....... *H04N 5/3559* (2013.01); *H04N 5/23245* (2013.01); *H04N 5/378* (2013.01)

(58) Field of Classification Search
    CPC ... H04N 5/3559; H04N 5/378; H04N 5/23245
    See application file for complete search history.

(56) References Cited

U.S. PATENT DOCUMENTS

| | | | |
|---|---|---|---|
| 5,198,660 A | 3/1993 | Yokoyama et al. | |
| 6,373,050 B1 * | 4/2002 | Pain | H04N 5/361 250/252.1 |
| 8,179,296 B2 | 5/2012 | Kelly et al. | |
| 8,625,012 B2 | 1/2014 | Yuan et al. | |
| 8,704,144 B2 | 4/2014 | Elliott et al. | |
| 9,154,713 B2 | 10/2015 | Denham et al. | |
| 2002/0141530 A1 | 10/2002 | Vrettos et al. | |

(Continued)

FOREIGN PATENT DOCUMENTS

| DE | 102005017158 A1 | 10/2006 |
|---|---|---|
| WO | 2012135542 A1 | 10/2012 |

OTHER PUBLICATIONS

U.S. Appl. No. 14/984,383, filed Dec. 30, 2015, Christian M. Boemler.

(Continued)

*Primary Examiner* — Jason A Flohre
(74) *Attorney, Agent, or Firm* — Lando & Anastasi, LLP (57) ABSTRACT

According to one aspect, embodiments herein provide a unit cell circuit comprising a photodetector, a first integration capacitor, a first input circuit configured to maintain charge on the integration capacitor corresponding to photo-current received from the photodetector during an integration period, a first comparator coupled to the first integration capacitor and configured to compare a first integration voltage across the first integration capacitor to a first threshold reference voltage, a register coupled to the first comparator, and a counter coupled to the register and configured to repeatedly increment a counter value over the integration period, wherein in response to determining that the first integration voltage is at a certain level in relation to the first threshold reference voltage, the first comparator is further configured to output a first output signal configured to control the register to latch the counter value of the counter.

18 Claims, 6 Drawing Sheets

(56) References Cited

U.S. PATENT DOCUMENTS

| | | | |
|---|---|---|---|
| 2004/0263654 A1* | 12/2004 | Lee | H04N 5/35527 348/297 |
| 2009/0289174 A1 | 11/2009 | Koyama et al. | |
| 2010/0226495 A1* | 9/2010 | Kelly | H04N 5/378 380/30 |
| 2012/0139887 A1 | 6/2012 | Hsu | |
| 2014/0016027 A1* | 1/2014 | Yang | H04N 5/23241 348/372 |
| 2014/0061442 A1 | 3/2014 | Denham | |
| 2015/0015759 A1* | 1/2015 | Kayahan | H04N 5/355 348/308 |
| 2015/0116564 A1 | 4/2015 | Williams | |
| 2016/0100114 A1* | 4/2016 | Bergey | H04N 5/3575 348/250 |
| 2016/0261811 A1* | 9/2016 | Dent | H04N 5/355 |
| 2016/0285444 A1 | 9/2016 | Denham et al. | |

OTHER PUBLICATIONS

International Search Report and Written Opinion for application No. PCT/US2017/045069 dated Nov. 7, 2017.

\* cited by examiner

FLUX RATE UNIT CELL FOCAL PLANE ARRAY

BACKGROUND

There are many different types of image capturing devices such as digital cameras, video cameras, or other photographic and/or image capturing equipment. These image capturing devices may use image sensors to capture images from a desired scene. For example, an image sensor may include an array of unit cells (i.e., a focal plane array) that receives light via a lens. The received light causes each unit cell in the array to accumulate an electric charge proportional to the light intensity at its location.

Focal Plane Arrays (FPAs) generally include a two-dimensional array of detector elements, or unit cells (i.e., pixels), organized in rows and columns. A circuit within each unit cell of the FPA accumulates charge corresponding to the incident flux radiation at a photodetector within the unit cell to generate an image of a scene or object within a field of view (FOV) of the FPA. For instance, most unit cell circuits detect optical radiation at a photodiode. The charge is accumulated in a capacitive element, which integrates the charge, and produces an integration voltage. The integration voltage corresponds to the intensity of the flux over a given time period referred to as the integration period (or integration interval, or integration time). The resulting voltage is conveyed by additional circuitry to an output of the FPA, which then may be used to construct the image of the scene that emitted the optical radiation. In some instances, such a voltage or charge can be digitized by circuitry of the FPA resulting in an array of digital values, at least one value for each unit cell of the FPA. Accordingly, in some instances FPAs may be used to convert a two-dimensional pattern of flux into a two-dimensional array of digital values, resulting in a digital image.

Each unit cell in an FPA generally corresponds to a picture element, or pixel, in the final image of the desired scene. A pixel is considered the smallest portion of a digital image. A digital image is generally made up of an array of pixels. Circuitry coupled to the image capturing device may perform post light capture processing steps to convert the accumulated charges from each unit cell into pixel information. This information may include the non-uniformity correction, color, saturation, brightness, or other information that a digital image storage or display format may require. Digital images may be stored in formats such as .JPG, .GIF, .TIFF, or any other suitable format. Digital images may be transferred in formats such as SMPTE-262, SMPTE-424, Camera Link, CoaXPress, Ethernet, HDMI, or any other suitable format.

SUMMARY

Aspects and embodiments discussed herein provide an improved high-dynamic intensity range imaging system, FPA, and imaging system unit cell circuit. In particular, rather than integrating flux for a fixed integration period, as suggested by conventional approaches, various aspects and embodiments of the imaging system, FPA, and imaging system unit cells discussed herein are configured to integrate a fixed amount of flux for a variable amount of time. More specifically, the flux rate unit cell described herein integrates flux on a relatively small sized integration capacitor while a counter is operating (e.g., incrementing). When the charge on the integration capacitor reaches a desired threshold level, the counter's value is latched into a register. The time based register value of the pixel can be normalized to a common time value (e.g., the projected time to fill the integration capacitor) in order to project the unit cell's integrated flux value in relation to other unit cell's in the system. An image processor can then generate a digital image based in the normalized value from each unit cell in the imaging system.

By monitoring the time required to charge a relatively small integration capacitor to a threshold level instead of monitoring the amount of charge accumulated over a fixed period of time, the dependency on multibit analog-digital converters and large integration capacitors can be eliminated while still providing a high dynamic range unit cell. In addition, by utilizing a time-based flux unit cell, as described above, the need for a precision charge dump circuit, as commonly used in digital pixel circuits, may be eliminated, the power requirements of the unit cell may be reduced relative to conventional unit cell approaches, and the asynchronous latching of time values may reduce the wide area current spikes as typically seen in the conventional unit cell approaches.

According to an aspect, provided herein is an imaging system unit cell circuit comprising a photodetector configured to generate a photo-current in response to receiving optical radiation, a first integration capacitor, a first input circuit coupled to the photodetector and to the first integration capacitor, the first input circuit configured to maintain charge on the integration capacitor corresponding to the photo-current received from the photodetector during an integration period, a first comparator coupled to the first integration capacitor and configured to compare a first integration voltage across the first integration capacitor to a first threshold reference voltage, a register coupled to the first comparator, and a counter coupled to the register and configured to repeatedly increment a counter value over the integration period, wherein in response to determining that the first integration voltage is at a certain level in relation to the first threshold reference voltage, the first comparator is further configured to output a first output signal configured to control the register to latch the counter value of the counter.

According to one embodiment, the first input circuit is further configured to accumulate charge on the first integration capacitor corresponding to the photo-current received from the photodetector during the integration period, wherein in response to determining that the first integration voltage is greater than the first threshold reference voltage, the first comparator is further configured to output the first output signal, and wherein in response to receiving the output signal, the register is configured to latch the counter value of the counter. In one embodiment, the imaging system unit cell circuit further comprises an image processing unit coupled to the register and configured to read-out the latched counter value from the register, normalize the latched counter value to a common time value, and generate a digital image based, at least in part, on the normalized counter value.

According to another embodiment, the first input circuit is further configured to remove an amount of charge from the first integration capacitor corresponding to the photo-current received from the photodetector during the integration period, wherein in response to determining that the first integration voltage is less than the first threshold reference voltage, the first comparator is further configured to output the first output signal, and wherein in response to receiving the first output signal, the register is configured to latch the counter value of the counter.

According to one embodiment, the imaging system unit cell further comprises a second integration capacitor, and a second input circuit coupled to the photodetector and to the second integration capacitor, the second input circuit configured to maintain charge on the integration capacitor corresponding to the photo-current received from the photodetector during the integration period. In one embodiment, the imaging system unit cell circuit further comprises a second comparator coupled to the second integration capacitor and configured to compare a second integration voltage across the first integration capacitor to a second threshold reference voltage, wherein in response to determining that the second integration voltage is at a certain level in relation to the second threshold reference voltage, the second comparator is further configured to output a second output signal configured to control the register to latch the counter value of the counter. In another embodiment, the imaging system unit cell circuit further comprises an OR gate, the first comparator includes a first output coupled to the OR gate, the second comparator includes a second output coupled to the OR gate, and the OR gate is configured to receive at least one of the first output signal and the second output signal and to control the register to latch the counter value of the counter in response to receiving at least one of the first output signal the second output signal.

According to another embodiment, the imaging system unit cell circuit further comprises a first switch coupled between the first integration capacitor and the first comparator, a second switch coupled between the second integration capacitor and the first comparator, and a controller coupled to the first switch and to the second switch and configured to operate the first switch to close in a first mode of operation, selectively coupling the first capacitor to the first comparator, and to operate the second switch to close in a second mode of operation, selectively coupling the second capacitor to the first comparator, wherein during the first mode of operation, the first comparator is configured to compare the first integration voltage across the first integration capacitor to the first threshold reference voltage and, in response to determining that the first integration voltage is at the certain level in relation to the first threshold reference voltage, output the first output signal, and wherein during the second mode of operation, the first comparator is configured to compare a second integration voltage across the second integration capacitor to the first threshold reference voltage and, in response to determining that the second integration voltage is at the certain level in relation to the first threshold reference voltage, output a second output signal configured to control the register to latch the counter value of the counter.

According to one embodiment, the imaging system unit cell further comprises a switch coupled across the first integration capacitor, wherein in response to receiving a first reset signal from a controller at a beginning of the integration period, the first switch is configured to selectively couple the first integration capacitor to ground such that the first integration capacitor discharges to ground. In one embodiment, the counter is further configured to receive a second reset signal from a controller at the beginning of the integration period, and wherein in response to receiving the second reset signal, the counter is configured to reset the counter value. In another embodiment, the register is configured to receive a third reset signal from a controller at the beginning of the integration period, and wherein in response to receiving the third reset signal, the register is configured to clear the register.

Another aspect discussed herein provides a method of detecting an image, the method comprising generating, with a photodetector, a photo-current in response to receiving optical radiation at the photodetector, maintaining, with a first input circuit coupled to the photodetector, charge on a first integration capacitor corresponding to the photo-current received from the photodetector during an integration period, comparing a first integration voltage across the first integration capacitor to a first threshold reference voltage, repeatedly incrementing a counter value of a counter over the integration period, and in response to determining that the first integration voltage is at a certain level in relation to the first threshold reference voltage, providing a first output signal to a register to operate the register to latch the counter value of the counter.

According to one embodiment, storing charge on the first integration capacitor includes accumulating charge on the first integration capacitor corresponding to the photo-current received from the photodetector during the integration period, and providing the first output signal to the register to operate the register to latch the counter value of the counter includes, in response to determining that the first integration voltage is greater than the first threshold reference voltage, operating the register to latch the counter value of the counter. In one embodiment, storing charge on the first integration capacitor includes removing an amount of charge from the first integration capacitor corresponding to the photo-current received from the photodetector during the integration period, and providing the first output signal to the register to operate the register to latch the counter value of the counter includes, in response to determining that the first integration voltage is less than the first threshold reference voltage, operating the register to latch the counter value of the counter.

According to another embodiment, the method further comprises reading-out the latched counter value from the register, normalizing the latched counter value to a common time value, and generating a digital image based, at least in part, on the normalized counter value. In one embodiment, the method further comprises receiving at least one reset signal at a beginning of the integration period, and in response to receiving the at least one reset signal at the beginning of the integration period, selectively coupling the first integration capacitor to ground such that the first integration capacitor discharges to ground, resetting the counter value; and clearing the register. In another embodiment, the method further comprises storing, with a second input circuit coupled to the photodetector, charge on the first integration capacitor corresponding to the photo-current received from the photodetector during the integration period, comparing a second integration voltage across the second integration capacitor to a first threshold reference voltage, and in response to determining that the second integration voltage is at a certain level in relation to the second threshold reference voltage, providing a second output signal to the register to operate the register to latch the counter value of the counter.

At least one aspect discussed herein provides an imaging system comprising a focal plane array including a plurality of unit cells, each unit cell of the plurality including a photodetector configured to generate a photo-current in response to receiving optical radiation, an integration capacitor, an input circuit coupled to the photodetector and to the integration capacitor, the input circuit configured to store charge on the integration capacitor corresponding to the photo-current received from the photodetector during an integration period, and a comparator coupled to the integration capacitor and configured to compare an integration voltage across the integration capacitor to a threshold reference voltage, a plurality of registers, each register coupled to the comparator of one of the plurality of unit cells, a counter coupled to the register of each unit cell of the plurality of unit cells and configured to repeatedly increment a counter value over the integration period, and an image processing unit coupled to the register of each unit cell of the plurality of unit cells, wherein in response to determining that the integration voltage is at a certain level in relation to the threshold reference voltage, each comparator is further configured to provide an output signal configured to control the corresponding register to latch the counter value of the counter, and wherein the image processing unit is configured to read-out the latched counter value from the register of each unit cell of the plurality of unit cells, normalize each read-out latched counter value to a common time value, and generate a digital image based on each of the normalized counter values.

According to one embodiment, each input circuit is further configured to accumulate charge on the corresponding integration capacitor corresponding to the photo-current received from the corresponding photodetector during the integration period, wherein in response to determining that the corresponding integration voltage is greater than the corresponding threshold reference voltage, each comparator is further configured to output the output signal, and wherein in response to receiving the output signal, each register is configured to latch the counter value of the counter.

According to another embodiment, each input circuit is further configured to remove an amount of charge from the corresponding integration capacitor corresponding to the photo-current received from the corresponding photodetector during the integration period, wherein in response to determining that the corresponding integration voltage is less than the corresponding threshold reference voltage, each comparator is further configured to output the output signal, and wherein in response to receiving the output signal, each register is configured to latch the counter value of the counter.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

As discussed above, typical unit cell circuits accumulate charge corresponding to the flux of impinging optical radiation. In a traditional analog unit cell, a well capacitor is coupled to a detector diode. The well capacitor integrates photo-current from the detector diode over an integration interval (e.g., 10 µs). Once per frame, the voltage on the well capacitor is transferred to a sample-and-hold capacitor and then transferred out, line by line, to an analog-to-digital converter (ADC) which converts the voltage to a binary value. However, as desired unit cell sizes have decreased, the ability of the well capacitor to store an effective amount of charge has diminished.

More specifically, conventional FPA analog unit cells typically saturate when the intensity of optical radiation becomes too large. For example, this may occur when glint conditions take place (e.g., visible light reflects off of an automobile or a hot exhaust). Indeed, many conventional FPA unit cells undesirably saturate when the intensity reaches a threshold limited by the parameters of the unit cell (the size of the capacitive element), which limits the amount of image data, and the dynamic range, that can be extracted from the received optical radiation.

Traditional "digital" unit cells provide for the analog to digital conversion of accumulated charge. In-unit cell analog to digital conversion imaging offers improved photo-charge capacity even as the desired size of unit cells continues to shrink (e.g., below 15 microns). For example, a traditional digital unit cell design includes a quantizing analog front end circuit which accumulates charge over a relatively small integration capacitor and is reset (i.e., discharged) each time a threshold charge is stored on the capacitor. The pattern of charging and resetting is repeated as more photo-current integrates. Each reset event is "accumulated" (i.e., counted) with a digital counter circuit. Each frame, a global snapshot is taken by copying the digital counter contents to a snapshot register and then reading the snapshot registers out, line by line. The effect is to exponentially increase well capacity of the imager while maintaining a relatively small unit cell size.

However, in such digital unit cells, the asynchronous/synchronous resetting of the accumulated charge on the integration capacitor requires a high level of precision and can result in relatively high current spikes in the digital unit cell. In addition, while the integration capacitor of a digital unit cell is being reset, the digital unit cell does not typically accumulate additional charge and any flux of optical radiation incident on the digital unit cell typically will not be integrated. Also, in a digital unit cell, the optional digitization circuitry for the residual charge, and high speed, high resolution, analog-to-digital convertors utilize a relatively high amount of power. Finally, fitting the entire digital pixel circuitry including the integration capacitor within a unit cell can be difficult.

Accordingly, various aspects and embodiments discussed herein provide an improved high-dynamic intensity range imaging system, FPA, and imaging system unit cell circuit. In particular, rather than integrating flux for a fixed integration period, as suggested by conventional approaches, various aspects and embodiments of the imaging system, FPA, and imaging system unit cells discussed herein are configured to integrate a fixed amount of flux for a variable amount of time. More specifically, the flux rate unit cell circuit described herein integrates flux on a relatively small sized integration capacitor while a counter is operating (e.g., incrementing). When the charge on the integration capacitor reaches a desired threshold level, the counter's value is latched into a register. The time based register value of the pixel can be normalized to a common time value (e.g., the projected time to fill the integration capacitor) in order to project the unit cell's integrated flux value in relation to other unit cells in the system. The normalized value from each unit cell circuit in the system can then be utilized by an image processor to generate an image of the FOV of the system.

By monitoring the time required to charge a relatively small integration capacitor to a threshold level instead of monitoring the amount of charge accumulated over a fixed period of time, the dependency on multibit analog-digital converters and large integration capacitors can be eliminated while still providing a high dynamic range unit cell. In addition, by utilizing a time-based flux unit cell, as described above, the need for a precision charge dump circuit is eliminated, the power requirements of the unit cell may be reduced relative to conventional unit cell approaches, and the asynchronous latches may reduce the wide area current spikes as typically seen in the conventional unit cell approaches.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
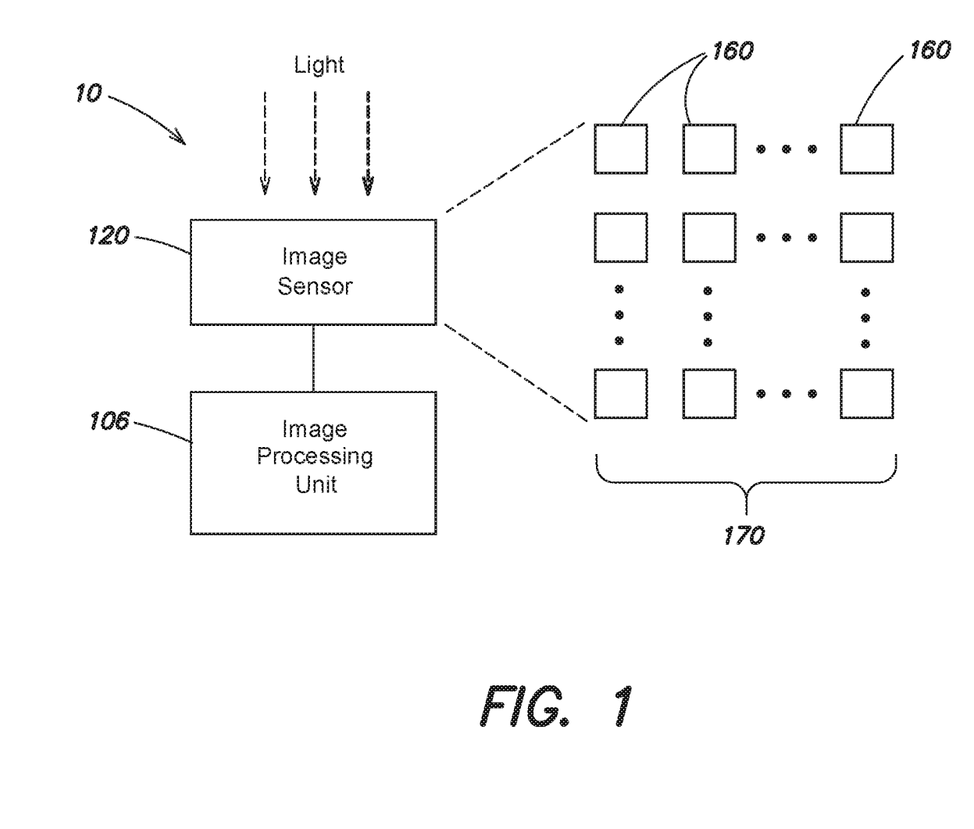
FIG. 1 is a block diagram illustrating an image capture device in accordance with aspects of the present invention.

FIG. 1 is a block diagram illustrating an image capture device 10 that may be used to capture images according to aspects described herein. For example device 10 may be a digital camera, video camera, infrared camera, or other photographic and/or image capturing equipment. Image capture device 10 comprises image sensor 120 and image processing unit 106. Image sensor 120 may be an active pixel sensor (APS) or other suitable light sensing device that can capture images. Image processing unit 106 may be a combination of hardware, software, and/or firmware that is operable to receive signal information from image sensor 120 and convert the signal information into a digital image.

Image sensor 120 includes an array 170 of unit cells 160. The array 170 can include any number of unit cells 160. Each unit cell 160 in the array 170 accumulates charge proportional to the light intensity at that location in the field of view and provides an indication of the intensity of light at that location to the image processing unit 106. Each unit cell 160 may correspond to a pixel in the captured electronic image.

A particular method for image capture using image capture device 10 may involve ripple capture, ripple read, and ripple reset operations. A ripple capture operation exposes each row of unit cells 160 from image sensor 120 to light in order. For example, a ripple capture operation may expose the top row of unit cells 160 of image sensor 120 to light, followed by the second row, followed by the third row, and so forth until the last row of unit cells 160 of image sensor 120 is exposed to light. A ripple read operation processes the light captured by each row of unit cells 160 from image sensor 120 in order. Similar to ripple capture, ripple read may process the top row of unit cells 160 of image sensor 120, followed by the second row, followed by the third row, and so forth until the last row of unit cells 160 of image sensor 120 is processed. A ripple reset operation to reset the rows of unit cells 160 of image sensor 120 may be performed similarly.

The ripple capture, ripple read, and ripple reset operations are typically performed on consecutive rows. For example, a ripple capture operation may begin with the first row of cells 160. As the ripple capture operation moves to the second row, a ripple read operation may begin on the first row of cells 160. After the ripple capture operation moves to the third row, the ripple read operation may begin on the second row and a ripple reset operation may begin on the first row. This may continue until the last row is processed. Once the last row is processed, the image may be processed, stored, and/or transmitted by the image processing unit 106.

As described above, ripple based operations are described above for the capturing of an image using the image capture device 10; however, in other embodiments, the image capture device 10 may utilize a different image capture method.

For example, in at least one embodiment, the image capture device utilizes a snapshot based method where all cells 160 in the device 10 are configured to integrate flux at the same time.

Figure 2:
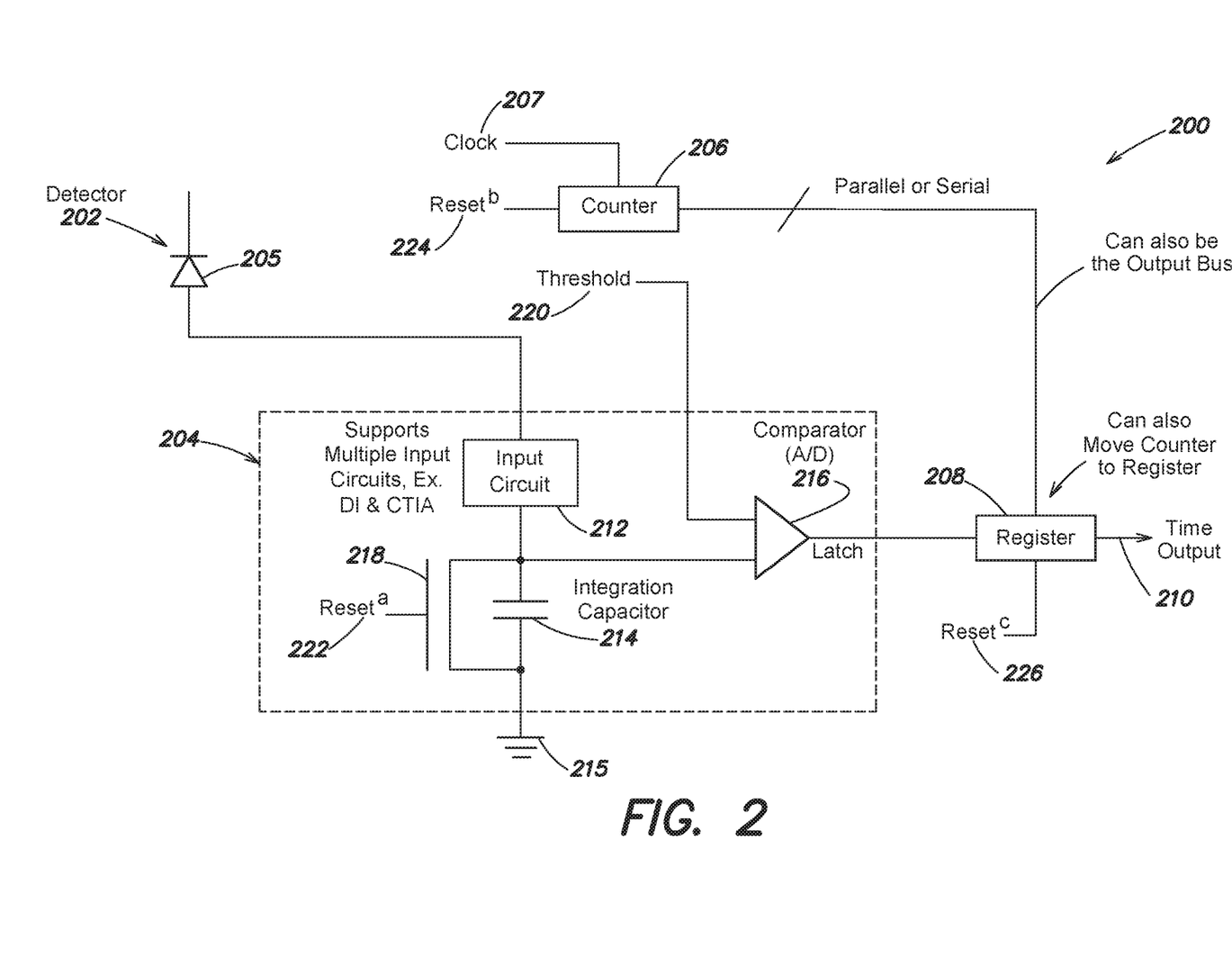
FIG. 2 is a schematic diagram of one example of a unit cell and supporting external circuitry in accordance with aspects of the present invention.

FIG. 2 is a schematic illustration of one example of a unit cell circuit 200 according to aspects of the invention. At least a portion of the unit cell circuit 200 is included in at least one of the unit cells 160 of FIG. 1. The unit cell circuit 200 includes a photodetector 202, an integration circuit 204, a counter 206, a register 208, and an output 210. In one embodiment, the integration circuit 204 includes an input circuit 212, an integration capacitor 214, a comparator 216, and a switch 218.

The photodiode 205 is coupled to an input of the input circuit 212. An output of the input circuit 212 is coupled to a first terminal of the switch 218, a first side of the integration capacitor 214, and a first terminal of the comparator 216. A second terminal of the switch 218 and a second side of the integration capacitor 214 are coupled to ground 215. The second terminal of the comparator 216 is coupled to a threshold voltage reference 220. The output of the comparator 216 is coupled to an input of the register 208. An output of the register 208 is configured to be coupled to an image processing unit (e.g., the image processing unit 106 shown in FIG. 1). The counter 206 is configured to be coupled to a clock 207 and to a control input of the register 208.

In various embodiments, the photodetector 202 is configured to receive optical radiation of a given wavelength from a scene being imaged and generate a corresponding photo-current. As the flux level of the optical radiation received by the photodetector 202 increases, the photo-current generated by the photodetector 202 will increase in a proportionate manner. In certain embodiments, the photodetector 202 may include any detector selected to be sensitive to optical radiation of a desired wavelength. In at least one example, optical radiation includes visible light, infrared radiation, and/or ultraviolet radiation. For instance, the photodetector 202 may include a photodiode 205 configured to generate a photo-current responsive to receiving wavelengths of light ranging from as small as 0.3 microns up to 2.5 microns and greater.

At the beginning of each integration period of the unit cell circuit 200, a first reset signal (Reset$^a$) 222 from a controller is provided to the switch 218 to couple the integration capacitor 214 to ground 215 such that the capacitor 214 is discharged, a second reset signal (Reset$^b$) 224 from a controller is provided to the counter 206 to reset the counter 206, and a third reset signal (Reset$^c$) 226 from a controller is provided to the register 208 to clear the register 208. After the reset signals 222, 224, 226 are applied, they are subsequently removed such that the integration capacitor 214 no longer discharges to ground (and can accumulate charge), the counter 206 beings to repeatedly increments its counter value, and the register becomes capable of storing a latched value when controlled to do so. In one embodiment, the image processing unit 106 provides the reset signals 222, 224, 226; however, in other embodiments, the reset signals 222, 224, 226 may be provided by any number of different controllers. According to one embodiment, the reset signals 222, 224, 226 are synchronous.

After the reset signals 222, 224, 226 are removed, the photodetector 202 can generate photo-current responsive to optical radiation incident on the photodetector 202 from an imaged scene. A level of charge or discharge, corresponding to the photo-current, and in particular a flux level (i.e., intensity/brightness) of the optical radiation received by the photodetector 202, is maintained by the input circuit 212 on the integration capacitor 214. According to one embodiment, the input circuit 212 is a capacitive transimpedance amplifier (CTIA) circuit that receives and amplifies the output of the photodetector 202 to a usable integration voltage within the unit cell circuit 200. In other embodiments, the input circuit 212 can be another appropriate type of unit cell input circuit, for example a direct injection (DI) circuit, a source follower per detector (SFD) circuit, or a feedback enhance direct injection (FEDI) circuit.

According to at least one embodiment, the input circuit 212 stores charge corresponding to the photo-current on the integration capacitor 214. As charge accumulates on, or is removed from, the integration capacitor 214, the voltage across the integration capacitor 214 increases or decreases. The comparator 216 compares the voltage across the integration capacitor 214 to the threshold voltage reference 220 and outputs a signal based on the relationship between the voltage across the integration capacitor 214 and the threshold voltage reference 220. For example, in one embodiment where charge is accumulating on the integration capacitor 214, in response to the voltage across the integration capacitor 214 being less than the threshold voltage reference 220, the comparator 216 outputs a signal (e.g., a low signal) that does not latch the register 208. In response to the voltage across the integration capacitor exceeding the threshold voltage reference 220, the comparator 216 outputs a signal (e.g., a high signal) that causes the register 208 to latch the current value of the counter 206.

The time-based value stored in the register 208 is read-out by an image processing unit (e.g., the image processing unit 106 shown in FIG. 1) from the output 210. The image processing unit 106 normalizes the time-based value of the unit cell circuit 200 to a common time value (e.g., the projected time to fill the integration capacitor 214) utilized across all unit cells 160 in the array 170 in order to project the unit cell circuit's 200 integrated flux value in relation to other unit cells 160 in the array 170. Utilizing the normalized time-based values read out from each unit cell circuit 200 (e.g., of each unit cell 160) in the array 170, the image processing unit 106 can generate a digital image of the imaged scene.

By monitoring the time required to charge a relatively small integration capacitor to a threshold level instead of monitoring the amount of charge accumulated over a fixed period of time, the dependency on multibit analog-to-digital converters and large integration capacitors can be eliminated while still providing a high dynamic range unit cell. In addition, by utilizing a time-based flux unit cell, as described above, the need for a precision charge dump circuit is eliminated, the power requirements of the unit cell may be reduced relative to conventional unit cell approaches, and the asynchronous latches of the register may reduce the wide area current spikes as typically seen in the conventional unit cell approaches.

Figure 3A:
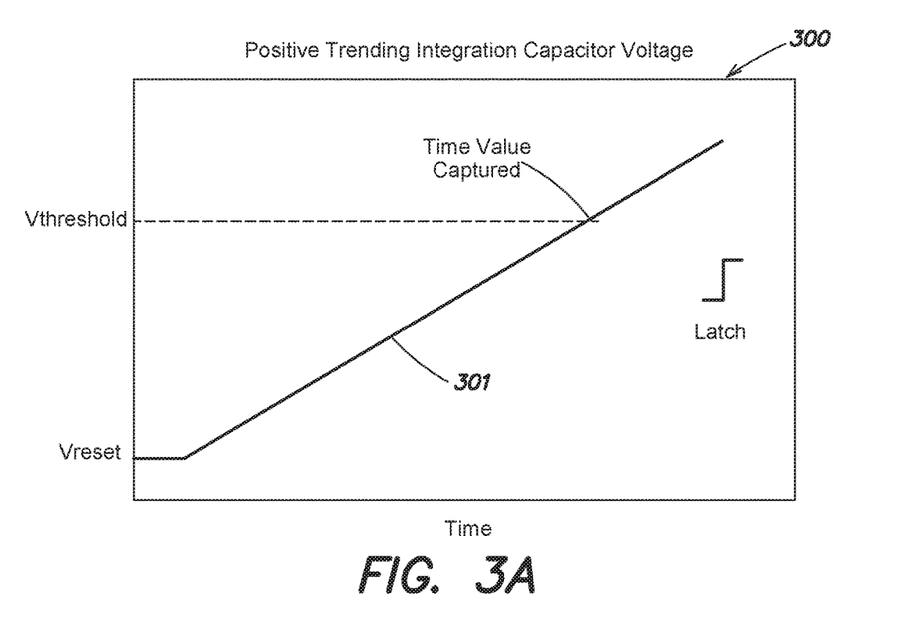
FIG. 3A is a graph illustrating a voltage across an integration capacitor that is trending in the positive direction in accordance with aspects of the present invention.
Figure 3B:
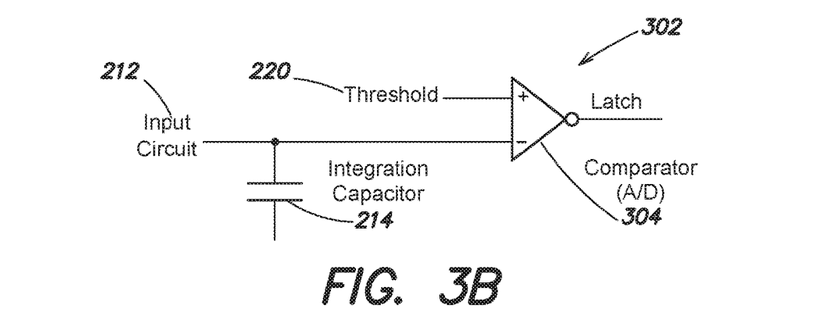
FIG. 3B is a schematic diagram of one embodiment of an integration circuit that operates based on the positively trending voltage in accordance with aspects of the present invention.

Operation of the integration circuit 204 is discussed in greater detail below with respect to FIGS. 3-6. As discussed above, according to one embodiment, the unit cell circuit 200 is configured such that charge corresponding to the photo-current accumulates on the integration capacitor 214. For example, FIG. 3A is a graph 300 illustrating a trace 301 that represents the voltage across the integration capacitor 214 that is trending in the positive direction as charge accumulates on the integration capacitor 214. FIG. 3B includes a first schematic diagram 302 of one embodiment of an integration circuit (e.g., the integration circuit 204 of FIG. 2) that operates based on the positively trending voltage 301 on the integration capacitor 214. As shown in the first schematic diagram 302, the integration circuit 204 includes a comparator 304 that implements a NOT operation at its output. The non-inverting input of the comparator 304 is coupled to the threshold voltage 220 (Vthreshold of FIG. 3A) and the inverting input of the comparator 304 is coupled to the integration capacitor 214.

As the voltage 301 increases across the integration capacitor 214, the comparator 304 compares the voltage 301 to the threshold voltage 220 (Vthreshold). In response to the threshold voltage 220 (Vthreshold) being greater than the voltage 301 across the integration capacitor 214, the comparator 304 with the NOT operation provides a negative latch signal to the register 208. In response to the threshold voltage 220 (Vthreshold) being less than the voltage 301 across the integration capacitor 214, the comparator 304 with the NOT operation provides a positive latch signal to the register 208 which controls the register 208 to latch the current value of the counter 206 (as discussed above).

Figure 3C:
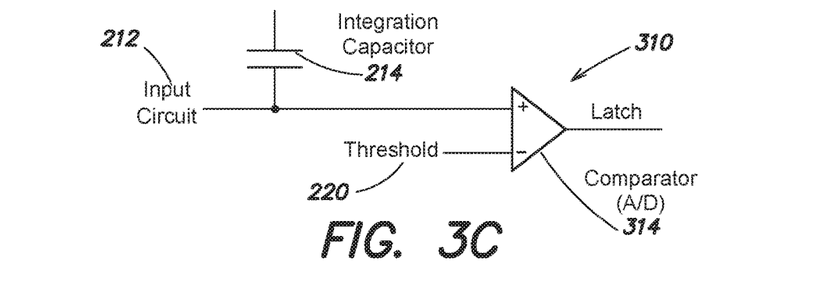
FIG. 3C is a schematic diagram of another embodiment of an integration circuit that operates based on the positively trending voltage in accordance with aspects of the present invention.

FIG. 3C includes a second schematic diagram 310 of another embodiment of an integration circuit (e.g., the integration circuit 204 of FIG. 2) that operates based on the positively trending voltage on the integration capacitor 214. As shown in the second schematic diagram 310, the integration circuit 204 includes a comparator 314 at its output. The non-inverting input of the comparator 314 is coupled to the integration capacitor 214 and the inverting input of the comparator 314 is coupled to the threshold voltage 220 (Vthreshold). As the voltage 301 increases across the integration capacitor 214, the comparator 314 compares the voltage 301 to the threshold voltage 220 (Vthreshold). In response to the threshold voltage 220 (Vthreshold) being greater than the voltage 301 across the integration capacitor 214, the comparator 314 provides a negative latch signal to the register 208. In response to the threshold voltage 220 (Vthreshold) being less than the voltage 301 across the integration capacitor 214, the comparator 314 provides a positive latch signal to the register 208 which controls the register 208 to latch the current value of the counter 206 (as discussed above).

As described above, the unit cell circuit 200 is configured such that charge corresponding to the photo-current accumulates on the integration capacitor 214 resulting in a voltage across the integration capacitor 214 that trends in a positive direction (i.e., increases) as charge accumulates on the integration capacitor 214. However, in other embodiments, the unit cell circuit 200 may be configured differently. In one embodiment, in response to receiving the photo-current responsive to optical radiation incident on the photodetector 202, charge corresponding to the photo-current, and in particular a flux level (i.e., intensity/brightness) of the optical radiation received by the photodetector 202, is removed from the integration capacitor 214 by the input circuit 212. As such, in such an embodiment, as the input circuit 212 receives photo-current response to optical radiation incident on the circuit 200, the voltage across the integration capacitor 214 trends in a negative direction (i.e., decreases).

Figure 4A:
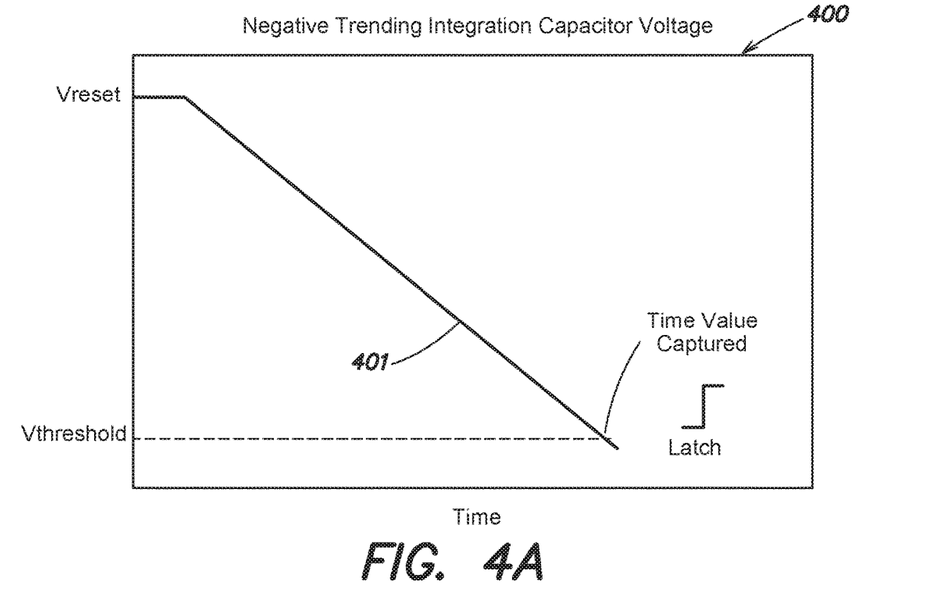
FIG. 4A is a graph illustrating a voltage across an integration capacitor that is trending in a negative direction in accordance with aspects of the present invention.
Figure 4B:
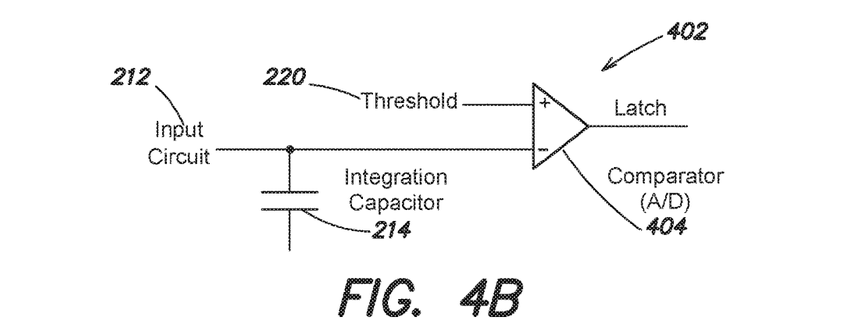
FIG. 4B is a schematic diagram of one embodiment of an integration circuit that operates based on the negatively trending voltage in accordance with aspects of the present invention.

For example, FIG. 4A is a graph 400 illustrating a trace 401 that represents a voltage across the integration capacitor 214 that trends in a negative direction in response to photo-current generated in response to light incident on the circuit 200. FIG. 4B is a first schematic diagram 402 of one embodiment of an integration circuit (e.g., the integration circuit 204 of FIG. 2) that operates based on the negatively trending voltage 401 on the integration capacitor 214. As shown in the first schematic diagram 402, the integration circuit 204 includes a comparator 404 at its output. The non-inverting input of the comparator 404 is coupled to the threshold voltage 220 (Vthreshold of FIG. 4A) and the inverting input of the comparator 404 is coupled to the integration capacitor 214.

As the voltage 401 decreases across the integration capacitor 214, the comparator 404 compares the voltage 401 to the threshold voltage 220 (Vthreshold). In response to the threshold voltage 220 (Vthreshold) being less than the voltage 401 across the integration capacitor 214, the comparator 404 provides a negative latch signal to the register 208. In response to the threshold voltage 220 (Vthreshold) being greater than the voltage 401 across the integration capacitor 214, the comparator 404 provides a positive latch signal to the register 208 which controls the register 208 to latch the current value of the counter 206 (as discussed above).

Figure 4C:
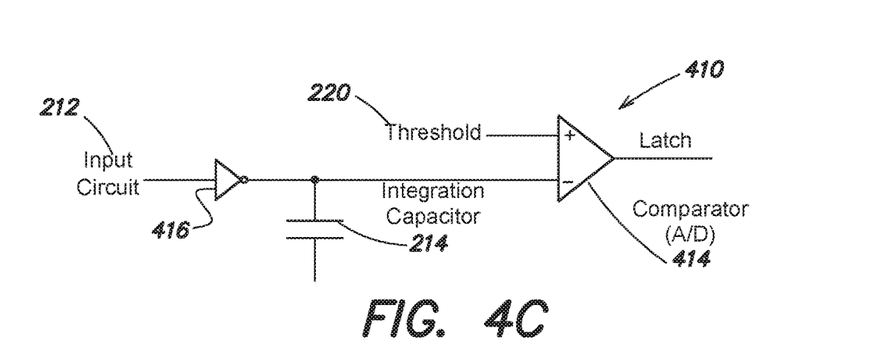
FIG. 4C is a schematic diagram of another embodiment of an integration circuit that operates based on the negatively trending voltage in accordance with aspects of the present invention.

FIG. 4C is a second schematic diagram 410 of another embodiment of an integration circuit (e.g., the integration circuit 204 of FIG. 2) that operates based on the negatively trending voltage on the integration capacitor 214. As shown in the second schematic diagram 410, the integration circuit 204 includes a comparator 414 at its output. The inverting input of the comparator 414 is coupled to the integration capacitor 214 and to the input circuit 212 via an inverter 416. The non-inverting input of the comparator 414 is coupled to the threshold voltage 220 (Vthreshold). As the voltage 401 across the integration capacitor 214 decreases, the comparator 414 compares the voltage 401 to the threshold voltage 220 (Vthreshold). In response to the threshold voltage 220 (Vthreshold) being less than the voltage 401 across the integration capacitor 214, the comparator 414 provides a negative latch signal to the register 208. In response to the threshold voltage 220 (Vthreshold) being greater than the voltage 401 across the integration capacitor 214, the comparator 414 provides a positive latch signal to the register 208 which controls the register 208 to latch the current value of the counter 206 (as discussed above).

Figure 5:
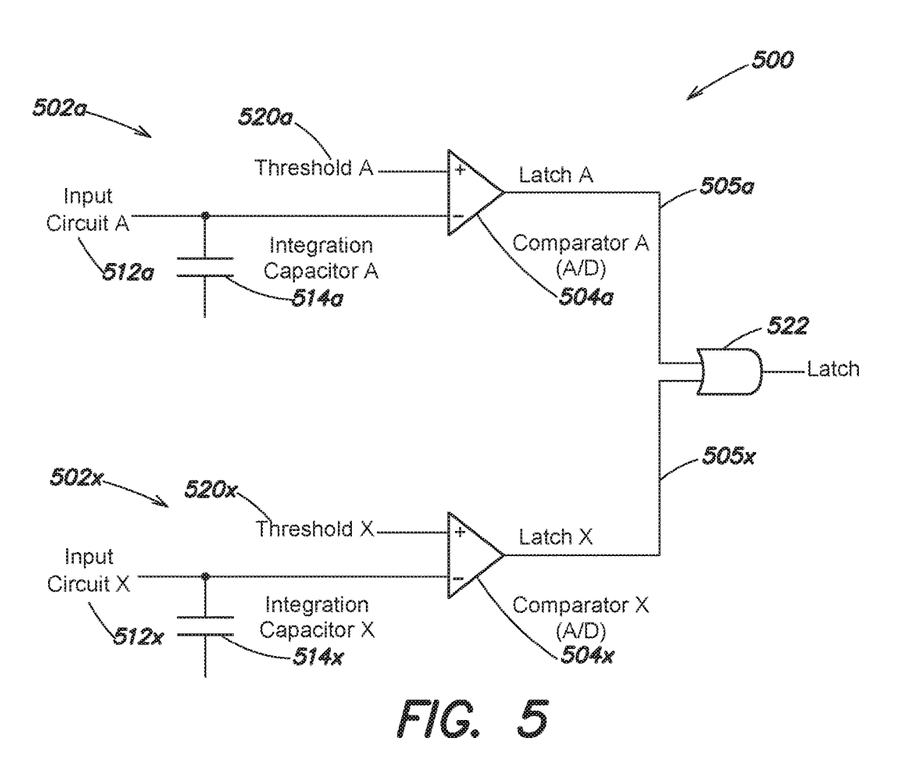
FIG. 5 is a schematic diagram of multiple integration circuits coupled together in parallel in a unit cell circuit enabling logical combining of multiple input circuits in accordance with aspects of the present invention.

According to at least one embodiment, the unit cell circuit 200 is configured to include multiple integration circuits 204. For example, FIG. 5 is a schematic diagram 500 of multiple integration circuits 502a, 502x coupled in parallel within a unit cell circuit according to at least one embodiment. Each integration circuit 502a, 502x can be configured to operate in substantially the same way as the integration circuits 302, 310, 402, 410 described above with respect to FIGS. 3A-4C, except that the output 505a, 505x of each integration circuit 502a, 502x (i.e., the output 505a, 505x of each comparator 504a, 504x) is coupled to a logic gate 522. In one embodiment, the logic gate 522 is an OR gate; however, in other embodiments, the logic gate 5232 may be another type of gate (e.g., an AND gate). Where the logic gate 522 is an OR gate; when either one of the integration circuits 502a, 502x outputs a positive signal (as described above), the OR gate 522 receives the positive signal and correspondingly outputs a positive latch signal to the register 208 (shown in FIG. 2) which controls the register 208 to latch the current value of the counter 206 (shown in FIG. 2 and discussed above).

By utilizing two comparators (e.g., as shown in FIG. 5), a unit cell circuit 200 can operate on both positively and negatively trending integration capacitor voltages to account for different types of light (e.g., light having different wavelengths). For example, according to one embodiment, the comparator 504a is configured to operate in substantially the same way as the integration circuit 302 described above with respect to FIG. 3B (i.e., operate on a positively trending integration capacitor voltage maintained by the input circuit 512*a*) and the comparator 504*x* is configured to operate in substantially the same way as the integration circuit 402 described above with respect to FIG. 4B (i.e., operate on a negatively trending integration capacitor voltage maintained by the input circuit 512*x*). In such a dual-band embodiment, the integration circuit 502*a* can be configured to accumulate charge on the integration capacitor 514*a* corresponding to light incident on the unit cell circuit 200 having a first wavelength and the integration circuit 502*x* can be configured to remove charge on the integration capacitor 514*x* corresponding to light incident on the unit cell having a second wavelength. If the voltage on the integration capacitor 514*a* exceeds the threshold voltage 520*a* or the voltage on the integration capacitor 514*x* falls below the threshold voltage 520*x*, the OR gate 522 outputs a positive latch signal to the register 208 which controls the register 208 to latch the current value of the counter 206 (as discussed above).

Figure 6:
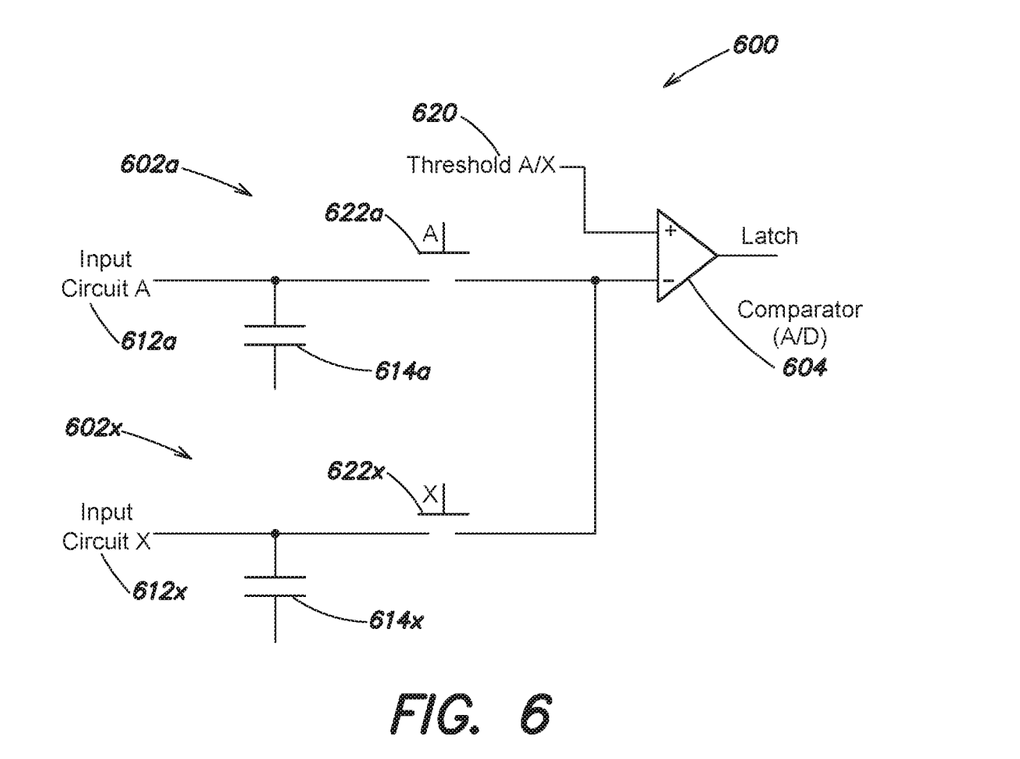
FIG. 6 is a schematic diagram of another embodiment of multiple integration circuits coupled together in parallel in a unit cell circuit enabling selection of multiple input circuits in accordance with aspects of the present invention.

FIG. 6 is a schematic diagram 600 of another embodiment including multiple integration circuits 602*a*, 602*x* coupled together within a unit cell circuit 200 of FIG. 2. Each integration circuit 602*a*, 602*x* is configured (and operates) substantially the same as the integration circuit 302 described above with respect to FIG. 3B (i.e., operate on a positively trending integration capacitor voltage maintained by the input circuits 612*a*, 612*x*), except that each integration circuit 602*a*, 602*x* utilizes the same threshold voltage reference 620 and the same comparator 604. More specifically, a controller (e.g., the image processing unit 106) operates a first switch 622*a* to couple the integration capacitor 614*a* to the comparator 604 at a first time, and operates a second switch 622*x* to couple the integration capacitor 614*x* to the comparator 604 at a second time. During the first time while the first switch 622*a* is closed, if the voltage across the integration capacitor 614*a* exceeds the threshold voltage reference 620, the comparator 604 provides a positive latch signal to as register 208 which controls the register 208 to latch the current value of the counter 206 (as discussed above). During the second time while the second switch 622*x* is closed, if the voltage across the integration capacitor 614*x* exceeds the threshold voltage reference 620, the comparator 604 provides a positive latch signal to a register 208 (shown in FIG. 2) which controls the register 208 to latch the current value of the counter 206 (shown in FIG. 2 and discussed above).

As discussed above (e.g., as shown in FIGS. 5-6), two integration circuits are coupled together in parallel within a unit cell. However, in other embodiments, any number of integration circuits can be selectively coupled together in parallel. For example, A to X integration circuits can be selectively coupled together in parallel where X=0 to n repeated integration circuits.

According to other embodiments, the unit cell circuit 200 can be adapted in any number of different ways to accommodate differing integration capacitor polarity ramps, thresholds, and multiple integration capacitors. For example, the unit cell circuit 200 can include replicated portions of the unit cell circuit 200 or additional inverter circuitry to enable the comparator (e.g., single bit A/D converter) and corresponding latch function to accommodate different implementations.

As described above, the unit cell circuit 200 compares at least one threshold voltage reference to the voltage across at least one integration capacitor. In one embodiment, the threshold voltage reference is predefined. In another embodiment, the threshold voltage reference is programmable or selectable to support different unit cell topologies and sensing signal polarities.

As also described above, a comparator provides a positive latch signal to a register which controls the register to latch the current value of a counter. In at least one embodiment, the output latch signal may be inverted to accommodate different implementations. According to at least one embodiment, at least one comparator utilized by the unit cell circuit described above may have hysteresis functionality preventing the multiple latching of time values.

As described above, the unit cell circuit 200 provides a positive latch signal to a register 208 which controls the register 208 to latch the current value of a counter 206. The counter 206 may be a regional counter coupled to more than one unit cell 160 in the array 170 in the image sensor 120, a global counter coupled to each unit cell 160 in the array 170 of the image sensor 120, or a local counter only coupled to a single unit cell 160 in the array 170 of the image sensor 120. According to at least one embodiment, the counter 206 and the register 208 of the unit cell circuit 200 are combined. In another embodiment, the counter 206 and the registers 208 are coupled together via a serial or parallel bus. In at least one embodiment, the counter 206 is a linear counter. In another embodiment, the counter 206 is a non-linear counter. In other embodiments, the counter 206 can be any other appropriate type of counter (e.g., a grey code counter, a linear shift register, etc.). As described above, the counter 206 is configured to increment a counter value; however, in at least one other embodiment, the counter 206 is configured to decrement a counter value from a reset condition.

According to one embodiment, the register 208 may be a local register located within the unit cell circuit 200. In another embodiment, the register 208 is a remote register located external the unit cell circuit 200. In one embodiment, the register 208 is a memory storage device.

According to at least one embodiment, the first reset signal (Reset$^a$) 222 can also be used to dump photo current once the register 208 has captured the value of the counter 206. This feature may be utilized to reduce the impact of excess photo current on adjacent pixels.

Various aspects and embodiments discussed herein provide an improved high-dynamic intensity range imaging system, FPA, and imaging system unit cell circuit. In particular, rather than integrating flux for a fixed integration period, as suggested by conventional approaches, various aspects and embodiments of the imaging system, FPA, and imaging system unit cells discussed herein are configured to integrate a fixed amount of flux for a variable amount of time. More specifically, the flux rate unit cell described herein integrates flux on a relatively small sized integration capacitor while a counter is operating (e.g., incrementing). When the charge on the integration capacitor reaches a desired threshold level, the counter's value is latched into a register. The time based register value of the pixel can be normalized to a common time value (e.g., the projected time to fill the integration capacitor) in order to project the unit cell's integrated flux value in relation to other unit cell's in the system.

By monitoring the time required to charge a relatively small integration capacitor to a threshold level instead of monitoring the amount of charge accumulated over a fixed period of time, the dependency on multibit analog-digital converters and large integration capacitors can be eliminated while still providing a high dynamic range unit cell. In addition, by utilizing a time-based flux unit cell, as described above, the need for a precision charge dump circuit may be eliminated, the power requirements of the unit cell may be reduced relative to conventional unit cell approaches, and the asynchronous latches may reduce the wide area current spikes as typically seen in the conventional unit cell approaches.

What is claimed is:

1. An imaging system unit cell circuit of a focal plane array including a plurality of unit cell circuits, the imaging system unit cell circuit comprising:
a photodetector configured to generate a photo-current in response to receiving optical radiation;
a first integration capacitor;
a second integration capacitor;
a first input circuit coupled to the photodetector and to the first integration capacitor, the first input circuit configured to maintain charge on the first integration capacitor corresponding to the photo-current received from the photodetector during an integration period;
a second input circuit coupled to the photodetector and to the second integration capacitor, the second input circuit configured to maintain charge on the second integration capacitor corresponding to the photo-current received from the photodetector during the integration period;
a first comparator coupled to the first integration capacitor and configured to compare a first integration voltage across the first integration capacitor to a first threshold reference voltage;
a register coupled to the first comparator; and
a counter coupled to the register and configured to repeatedly increment a counter value over the integration period,
wherein in response to determining that the first integration voltage is at a certain level in relation to the first threshold reference voltage, the first comparator is further configured to output a first output signal configured to control the register to latch the counter value of the counter.

2. The imaging system unit cell circuit of claim 1, wherein the first input circuit is further configured to accumulate charge on the first integration capacitor corresponding to the photo-current received from the photodetector during the integration period,
wherein in response to determining that the first integration voltage is greater than the first threshold reference voltage, the first comparator is further configured to output the first output signal, and
wherein in response to receiving the output signal, the register is configured to latch the counter value of the counter.

3. The imaging system unit cell circuit of claim 2, further comprising an image processing unit coupled to the register and configured to:
read-out the latched counter value from the register,
normalize the latched counter value to a common time value; and
generate a digital image based, at least in part, on the normalized counter value.

4. The imaging system unit cell circuit of claim 1, wherein the first input circuit is further configured to remove an amount of charge from the first integration capacitor corresponding to the photo-current received from the photodetector during the integration period,
wherein in response to determining that the first integration voltage is less than the first threshold reference voltage, the first comparator is further configured to output the first output signal, and
wherein in response to receiving the first output signal, the register is configured to latch the counter value of the counter.

5. The imaging system unit cell circuit of claim 1, further comprising:
a second comparator coupled to the second integration capacitor and configured to compare a second integration voltage across the second integration capacitor to a second threshold reference voltage;
wherein in response to determining that the second integration voltage is at a certain level in relation to the second threshold reference voltage, the second comparator is further configured to output a second output signal configured to control the register to latch the counter value of the counter.

6. The imaging system unit cell circuit of claim 5, further comprising an OR gate, wherein the first comparator includes a first output coupled to the OR gate,
wherein the second comparator includes a second output coupled to the OR gate, and
wherein the OR gate is configured to receive at least one of the first output signal and the second output signal and to control the register to latch the counter value of the counter in response to receiving at least one of the first output signal the second output signal.

7. The imaging system unit cell circuit of claim 1, further comprising:
a first switch coupled between the first integration capacitor and the first comparator,
a second switch coupled between the second integration capacitor and the first comparator, and
a controller coupled to the first switch and to the second switch and configured to operate the first switch to close in a first mode of operation, selectively coupling the first capacitor to the first comparator, and to operate the second switch to close in a second mode of operation, selectively coupling the second capacitor to the first comparator,
wherein during the first mode of operation, the first comparator is configured to compare the first integration voltage across the first integration capacitor to the first threshold reference voltage and, in response to determining that the first integration voltage is at the certain level in relation to the first threshold reference voltage, output the first output signal, and
wherein during the second mode of operation, the first comparator is configured to compare a second integration voltage across the second integration capacitor to the first threshold reference voltage and, in response to determining that the second integration voltage is at the certain level in relation to the first threshold reference voltage, output a second output signal configured to control the register to latch the counter value of the counter.

8. The imaging system unit cell circuit of claim 1, further comprising a switch coupled across the first integration capacitor,
wherein in response to receiving a first reset signal from a controller at a beginning of the integration period, the first switch is configured to selectively couple the first integration capacitor to ground such that the first integration capacitor discharges to ground.

9. The imaging system unit cell circuit of claim 8, wherein the counter is further configured to receive a second reset signal from a controller at the beginning of the integration period, and wherein in response to receiving the second reset signal, the counter is configured to reset the counter value.

10. The imaging system unit cell circuit of claim 9, wherein the register is configured to receive a third reset signal from a controller at the beginning of the integration period, and
wherein in response to receiving the third reset signal, the register is configured to clear the register.

11. A method of detecting an image, the method comprising:
generating, with a photodetector, a photo-current in response to receiving optical radiation at the photodetector;
maintaining, with a first input circuit coupled to the photodetector, charge on a first integration capacitor corresponding to the photo-current received from the photodetector during an integration period;
maintaining, with a second input circuit coupled to the photodetector, charge on a second integration capacitor corresponding to the photo-current received from the photodetector during the integration period;
comparing a first integration voltage across the first integration capacitor to a first threshold reference voltage;
comparing a second integration voltage across the second integration capacitor to a second threshold reference voltage;
repeatedly incrementing a counter value of a counter over the integration period;
in response to determining that the first integration voltage is at a certain level in relation to the first threshold reference voltage, providing a first output signal to a register to operate the register to latch the counter value of the counter; and
in response to determining that the second integration voltage is at a certain level in relation to the second threshold reference voltage, providing a second output signal to the register to operate the register to latch the counter value of the counter.

12. The method of claim 11, wherein maintaining charge on the first integration capacitor includes accumulating charge on the first integration capacitor corresponding to the photo-current received from the photodetector during the integration period, and
wherein providing the first output signal to the register to operate the register to latch the counter value of the counter includes, in response to determining that the first integration voltage is greater than the first threshold reference voltage, operating the register to latch the counter value of the counter.

13. The method of claim 11, wherein maintaining charge on the first integration capacitor includes removing an amount of charge from the first integration capacitor corresponding to the photo-current received from the photodetector during the integration period, and
wherein providing the first output signal to the register to operate the register to latch the counter value of the counter includes, in response to determining that the first integration voltage is less than the first threshold reference voltage, operating the register to latch the counter value of the counter.

14. The method of claim 11, further comprising:
reading-out the latched counter value from the register, normalizing the latched counter value to a common time value; and
generating a digital image based, at least in part, on the normalized counter value.

15. The method of claim 11, further comprising:
receiving at least one reset signal at a beginning of the integration period; and
in response to receiving the at least one reset signal at the beginning of the integration period, selectively coupling the first integration capacitor to ground such that the first integration capacitor discharges to ground, resetting the counter value; and clearing the register.

16. An imaging system comprising:
a focal plane array including a plurality of unit cells, each unit cell of the plurality including:
a photodetector configured to generate a photo-current in response to receiving optical radiation;
a first integration capacitor,
a second integration capacitor,
a first input circuit coupled to the photodetector and to the first integration capacitor, the first input circuit configured to maintain charge on the first integration capacitor corresponding to the photo-current received from the photodetector during an integration period;
a second input circuit coupled to the photodetector and to the second integration capacitor, the second input circuit configured to maintain charge on the second integration capacitor corresponding to the photo-current received from the photodetector during the integration period; and
a comparator coupled to the first integration capacitor and configured to compare an integration voltage across the first integration capacitor to a threshold reference voltage;
a plurality of registers, each register coupled to the comparator of one of the plurality of unit cells;
a counter coupled to the register of each unit cell of the plurality of unit cells and configured to repeatedly increment a counter value over the integration period; and
an image processing unit coupled to the register of each unit cell of the plurality of unit cells;
wherein in response to determining that the integration voltage is at a certain level in relation to the threshold reference voltage, each comparator is further configured to provide an output signal configured to control the corresponding register to latch the counter value of the counter, and
wherein the image processing unit is configured to read-out the latched counter value from the register of each unit cell of the plurality of unit cells, normalize each read-out latched counter value to a common time value, and generate a digital image based on each of the normalized counter values.

17. The imaging system unit cell circuit of claim 16, wherein each first input circuit is further configured to accumulate charge on the corresponding first integration capacitor corresponding to the photo-current received from the corresponding photodetector during the integration period,
wherein in response to determining that the corresponding integration voltage is greater than the corresponding threshold reference voltage, each comparator is further configured to output the output signal, and
wherein in response to receiving the output signal, each register is configured to latch the counter value of the counter.

18. The imaging system unit cell circuit of claim 16, wherein each first input circuit is further configured to remove an amount of charge from the corresponding first integration capacitor corresponding to the photo-current received from the corresponding photodetector during the integration period, wherein in response to determining that the corresponding integration voltage is less than the corresponding threshold reference voltage, each comparator is further configured to output the output signal, and wherein in response to receiving the output signal, each register is configured to latch the counter value of the counter.

* * * * *